United States Patent [19]
Lai et al.

[11] Patent Number: 5,180,563
[45] Date of Patent: Jan. 19, 1993

[54] TREATMENT OF INDUSTRIAL WASTES

[75] Inventors: Wen-Chao Lai, Westboro; William J. Rourke, Worcester; Samuel Natansohn, Sharon, all of Mass.

[73] Assignee: GTE Products Corporation, Danvers, Mass.

[21] Appl. No.: 426,625

[22] Filed: Oct. 24, 1989

[51] Int. Cl.⁵ .............. C01F 17/00; C22B 59/00; C22B 47/00; C22B 7/00
[52] U.S. Cl. ................... 423/21.5; 423/21.1; 423/50; 423/55; 423/140
[58] Field of Search ............ 423/21.1.263, 50, 55, 423/140, DIG. 14, 21.5; 75/101 R, 101 BE, 108, 114, 121

[56] References Cited

U.S. PATENT DOCUMENTS

| | | | |
|---|---|---|---|
| 2,997,368 | 8/1961 | Barent et al. | 423/50 |
| 3,970,738 | 7/1976 | Matsui et al. | 423/140 |
| 4,353,878 | 10/1982 | Quatrini et al. | 423/55 |
| 4,624,703 | 11/1986 | Vanderpool et al. | 75/101 R |
| 4,626,280 | 12/1986 | Vanderpool et al. | 75/101 R |
| 4,718,995 | 1/1988 | Vanderpool et al. | 204/112 |
| 4,718,996 | 1/1988 | Vanderpool et al. | 204/112 |
| 4,751,061 | 6/1988 | Kim et al. | 423/21.5 |
| 4,765,909 | 8/1988 | Rourke et al. | 210/672 |
| 4,808,384 | 2/1989 | Vanderpool et al. | 423/21.1 |
| 4,816,233 | 3/1989 | Rourke et al. | 423/21.5 |

OTHER PUBLICATIONS

Sigma Chemical Company, 1987 catalog. p. 769.

Peters et al., Chemical Separations and Measurements, 1974, pp. A.1–A.2.

*Primary Examiner*—Michael Lewis
*Assistant Examiner*—Steven Bos
*Attorney, Agent, or Firm*—Carl F. Ruoff

[57] ABSTRACT

A process for treating a sludge comprises digesting the waste material with a mixture of sulfuric acid and hydrogen peroxide to form an acidic digestion solution and a digestion residue. The digestion residue containing the major portion of tungsten and other refractory metals is reacted with NaOH to solubilize the major portion of tungsten values to a liquid concentrate that is separated from the insoluble solid that contains the major portion of the other refractory metals such as tantalum and niobium. The digestion solution containing the major portion of the transition and rare metals is treated with a base to selectively recover iron as a solid iron hydroxide precipitate which is separated from the resulting liquor. The liquor is then treated again with a base to selectively recover the other metals such as Sc, Cr, rare earths, but not Mn, as a solid metal hydroxide precipitate that is separated from the solution. The resulting solution containing the major portion of Mn is treated with a base to a pH of about 9.5 under an oxidative environment to recover manganese as a solid manganese hydroxide precipitate that is separated from the solution. The final waste effluent at a pH of 9.5 can be used for its alkali values and for diluting the concentrated acidic solution from the initial digestion of the waste materials.

9 Claims, No Drawings

TREATMENT OF INDUSTRIAL WASTES

FIELD OF INVENTION

This invention relates to the treatment of waste materials. More particularly, it relates to a process for the treatment of waste materials and for the recovery of metal values therefrom.

BACKGROUND

In the processing of metal bearing ores, such as tungsten ores, waste sludges are generated. These sludges can present disposal problems because such sludges do not degenerate and contain sufficient metal values to make normal waste treatment via normal sewage treatment impractical.

U.S. Pat. No. 4,624,703 issued Nov. 25, 1986 and assigned to GTE Products Corporation, discloses a process for recovering tungsten, scandium, iron and manganese from a tungsten bearing material via a solvent extraction process using a dialkyl phosphoric acid to extract the scandium. U.S. Pat. No. 4,624,703 and the disclosure thereof is incorporated by reference herein.

U.S. Pat. No. 4,626,280 issued Dec. 2, 1986 and assigned to GTE Products Corporation discloses another process for recovering tungsten, scandium, iron and manganese from a tungsten bearing material via a process in which the material is digested in an aqueous sulfur dioxide solution and a tertiary alkyl primary amine is used as an extracting agent for the scandium. U.S. Pat. No. 4,626,280 and the disclosure thereof is incorporated by reference herein.

U.S. Pat. No. 4,718,995 issued Jan. 12, 1988 and is assigned to GTE Products Corporation is a continuation-in-part of the aforementioned U.S. Pat. No. 4,626,280 and discloses using sulfuric acid and a reducing agent to digest the tungsten bearing material. U.S. Pat. 4,718,995 and the disclosure thereof is incorporated by reference herein.

U.S. Pat. No. 4,718,996 issued Jan. 12, 1988 assigned to GTE Products Corporation is a continuation-in-part of U.S. Pat. No. 4,624,703, mentioned above. U.S. Pat. No. 4,718,996 discloses the additional aspect of using a sulfur dioxide aqueous solution to digest the tungsten bearing material. U.S. Pat. No. 4,718,996 and the disclosure thereof is incorporated by reference herein.

U.S. Pat. No. 4,808,384 issued Feb. 28, 1989 assigned to GTE Products Corporation relates to the process disclosed in U.S. Pat. No. 4,624,703 mentioned above. U.S. Pat. No. 4,808,384 discloses the additional aspect of using coal as a reducing agent in the digestion step. That patent and the disclosure thereof is incorporated by reference herein.

A process that turns such wastes into usable products cost-effectively is believed to be an advancement in the art.

SUMMARY OF THE INVENTION

In accordance with one aspect of this invention, there is provided a unique and cost-effective process for eliminating and utilizing an industrial waste by recovering its total metal values without generating any hazardous wastes. The process comprises the steps of a) contacting a solid waste material containing metal values that comprise at least some tungsten, iron, scandium and manganese and, optionally, at least one other metal value which metal is selected from the group consisting of Group III metals, cobalt, nickel and rare earth metals, other refractory metals and silicon, with a sulfuric acid solution containing a concentration of hydrogen peroxide of at least about 3% by volume for a sufficient time at a sufficient temperature to form a first aqueous acidic leachate containing the major portion of said scandium, manganese, iron and, if present, the other metal values and a first solid residue containing the tungsten, and, if present, the other refractory metals, b) separating the first aqueous acidic leachate and the first solid residue, c) digesting the first solid residue with sufficient alkali metal base for a sufficient time to form a first digested solution containing a major portion of the tungsten and a second solid residue containing, if present, the other refractory metals, d) separating the second solid residue and the first digested solution, e) adjusting the pH of the first aqueous acidic leachate to achieve a pH of from about 3 to about 4 to yield a solid iron-containing product and an aqueous solution containing the manganese, scandium and, if present, the other metal value, f) separating the solid iron containing product and the aqueous solution containing the manganese and the scandium and, if present, the other metal value, g) adjusting the pH of the aqueous solution containing the manganese and scandium and, if present, the other metal value, to achieve a pH of from about 7 to about 8 to yield a solid product containing scandium and, if present, the other metal value, and an aqueous solution containing the manganese, i) separating the solid product and the aqueous solution containing the manganese, h) oxidizing the aqueous solution containing the manganese at a pH of from about 8 to about 10 in the presence of a base to form a solid manganese containing product and an aqueous solution essentially depleted of metal values, and k) separating the manganese containing product and the aqueous solution essentially depleted of metal values.

In another aspect of this invention there is provided a process in accordance with the above described process an embodiment wherein the sulfuric acid has a normality of greater than about 1.

In still another aspect of this invention there is provided a process in accordance with the above described process an embodiment wherein the iron is recovered as iron oxide.

In an additional aspect of this invention there is provided a process in accordance with the above described process an embodiment wherein manganese is recovered as an oxide of manganese.

In still another aspect of this invention there is provided a process in accordance with the above described process an embodiment wherein the tungsten is recovered as an aqueous solution of sodium tungstate.

In still another aspect of this invention there is provided a process in accordance with the above described process an embodiment wherein the scandium containing product is dissolved in an aqueous solution of hydrochloric acid at a pH of from about 1.9 to about 2.1 and is thereafter removed from the resulting solution by contacting the resulting solution with an iminodiacetic acid cation exchange resin.

In still another aspect of this invention there is provided a process in accordance with the above described process an embodiment wherein the the scandium is eluted from the cation exchange resin by a chelating agent selected from the group consisting of diglycolic acid, carboxylic acids, ethylenediaminetetraacetic acid and mixtures thereof.

DETAILED DESCRIPTION

For a better understanding of the present invention together with other and further objects, advantages and capabilities thereof, reference is made to the following detailed description and appended claims in connection with the above summary.

Our U.S. Pat. No. 4,765,909 issued on Aug. 23, 1988 and is assigned to the same assignee as this invention. U.S. Pat. No. 4,765,909 discloses a method for the separation of scandium and via the utilization of a cationic exchange resin followed by selectively eluting the scandium with an acidic solution of a chelating agent. The thorium is then eluted with hydrochloric acid solution. U.S. Pat. No. 4,765,909 is incorporated by reference herein.

Our U.S. Pat. No. 4,816,233 issued on Mar. 28, 1989 and is assigned to the same assignee as this invention. U.S. Pat. No. 4,816,233 discloses a method for the recovery of scandium from a tungsten ore residue containing scandium and other metals including manganese and iron. In the process disclosed, this residue is dissolved in an acid solution containing a reducing agent to convert the manganese to the divalent state, an iron reducing agent is added to convert the iron present to the divalent state, the pH is then adjusted to about 1.9 to about 2.1 and the scandium is removed by an iminodiacetic ion exchange resin and is thereafter eluted from the resin with a chelating agent to form an elution solution. The scandium is then precipitated from the elution solution by adding a precipitating agent such as ammonium hydroxide to thereby recover the scandium values. U.S. Patent 4,816,233 is incorporated by reference herein.

This invention addresses the safe disposal of industrial wastes with the simultaneous recovery of valuable strategic metals. Therefore, there is a major challenge to develop a unique and cost-effective technology which turns an industrial waste method into useful products. Such a process is the best solution to the ever-increasing problems that industrial wastes impose to the environment. Complete waste utilization is most attractive, economically, technologically and environmentally. It achieves simultaneously three desirable goals: maximal resource utilization and conservation, safe disposal of wastes without the long-term potential liability associated with the landfill disposal, and useful products from wastes. The waste material referred to herein is mainly alkali digestion tailings from a tungsten processing plant but the principles are equally applicable to other waste materials.

In processing of tungsten ores such as wolframites, huebnerites, scheelites, etc., by an alkali digestion operation to solubilize the tungsten values, a waste sludge is generated which contains, in addition to the residual tungsten, many valuable metals. Iron and manganese are the two major components, while scandium and tungsten are the most valuable components even though present in much lower concentrations. Table 1 lists the elemental composition of such a waste sludge as determined by a spark source mass spectrometric method. It indicates that the waste sludge also contains a number of other valuable strategic metals such as, cobalt, nickel, lead, zinc, rare earths, thorium, uranium, chromium, tantalum, niobium, etc. Landfill disposal treats a waste as a useless material whereas as indicated by the data in Table 1 the ore tailings contain substantial metal values and are treated as a viable resource here. The strategy taken in this approach is the disposal of wastes by converting their components into useful products. This invention is addressing a unique technology for waste disposal and utilization.

The industrial waste material of this disclosure can be essentially any material having high metal content of a complex composition. However, the waste material recited herein is mainly the ore tailings from the processing of tungsten ones such as wolframites, huebnerites, scheelites, etc. The tungsten ores are digested in sodium hydroxide to extract the tungsten values resulting in an insoluble residue as a waste sludge. The waste sludge contains two major components, Fe and Mn and many other metals in smaller concentrations. The elemental composition of a typical dried sludge sample, in percent by weight as determined by a spark source mass spectrometric method is shown in Table 1.

TABLE 1
ELEMENTAL COMPOSITION OF THE SLUDGE SAMPLE

| No. | Element | Wt, % | No. | Element | Wt, % |
|---|---|---|---|---|---|
| 1 | Fe | 22 | 23 | Y | 0.034 |
| 2 | Mn | 20 | 24 | Nd | 0.029 |
| 3 | W | 4.3 | 25 | La | 0.027 |
| 4 | Si | 3.2 | 26 | Mo | 0.027 |
| 5 | Sn | 0.96 | 27 | Sc | 0.021 |
| 6 | Na | 0.84 | 28 | P | 0.021 |
| 7 | Ca | 0.75 | 29 | Sb | 0.020 |
| 8 | Ti | 0.40 | 30 | Gd | 0.020 |
| 9 | Ta | 0.38 | 31 | Dy | 0.019 |
| 10 | Nb | 0.30 | 32 | Er | 0.014 |
| 11 | Mg | 0.21 | 33 | V | 0.012 |
| 12 | Pb | 0.19 | 34 | Ba | 0.012 |
| 13 | Ni | 0.15 | 35 | Yb | 0.011 |
| 14 | Co | 0.11 | 36 | Al | 0.011 |
| 15 | Bi | 0.10 | 37 | Pr | 0.0067 |
| 16 | Ce | 0.082 | 38 | Sr | 0.0053 |
| 17 | Th | 0.067 | 39 | Ho | 0.0042 |
| 18 | Cu | 0.062 | 40 | Lu | 0.0042 |
| 19 | K | 0.0061 | 41 | Sm | 0.0039 |
| 20 | U | 0.0049 | 42 | Tb | 0.0028 |
| 21 | Zn | 0.0048 | 43 | Rb | 0.0015 |
| 22 | Cr | 0.037 | | | |

A preferred embodiment of the process of this invention comprises the following general steps:

Step 1 —The leaching of the transition and rare metals from the waste sludge with a mixture of concentrated sulfuric acid and hydrogen peroxide at a sufficient temperature for a sufficient time to form an acidic leachate and an acid residue which is separated from the solution. The residue contains the major portion of tungsten and other refractory metals such as tantalum and niobium, while the acidic leachate contains the major portion of Fe, Mn, Sc, rare earths, Co, Cr, etc. Hydrogen peroxide possesses two unique properties in the practice of this invention. It acts as a reductant to facilitate the dissolution of tetra-and tri-valent manganese into solution and as an oxidant to convert divalent iron into trivalent state to facilitate its subsequent recovery by a selective precipitation process.

Step 2 —The digestion of the acid residue with a base to form a digested solution which is separated from the digested residue and the digested solution that contains the major portion tungsten and can be a source for preparation of various tungsten compounds. The digested residue contains the major portion of of the other refractory metals, tantalum and niobium and some transition metals such as Fe, Mn, etc.

Step 3—The digestion of the alkali residue obtained from Step 2 with a mineral acid to form a digested solution which is separated from the insoluble residue. The residue contains the major portion of tantalum, niobium and other refractory metals and is a viable source of these metals. The solution contains mainly the transition metals such as iron and manganese and is combined with the acid solution from Step 1.

Step 4—The selective recovery of the iron values by titrating the acidic solution, mainly from Step 1, with a base to a pH between 3 and 4, to yield a solid hydrous iron oxide precipitate which is separated from the solution. The precipitate contains the major portion of iron while the resulting solution contains the major portion of manganese, and other transition and rare metals.

Step 5—The selective recovery of the other transition and rare metals except manganese by titrating the resulting solution of Step 4 with a base at a pH range of from about 7 to about 8, preferably 7.5, to yield a solid hydrous metal hydroxide precipitate which is then separated from the solution. The solution contains the major portion of the manganese values while the precipitate contains the major portion of these metals such as scandium, rare earths, chromium, zinc, etc.

Step 6—The complete recovery of manganese by treating the solution from Step 5 with a base under an oxidative environment at a pH range between 8 to 10, preferably 9.5, to form a solid manganese hydroxide precipitate which is separated from the solution. The final solution at a pH of about 9.5 contains virtually no heavy metals. It can be discharged directly. However, for better process economics, it can be recycled back to the acidic solutions from Steps 1 and/or 3 for the utilization of its alkaline and water values. The precipitate contains the major portion of the manganese and is a viable high grade source of manganese. No hazardous wastes have been generated in this disclosed process.

The present invention provides a unique and cost effective process for converting a waste material into valuable products. It provides a desirable solution for disposing a waste because it achieves simultaneously environmental protection and resource conservation and utilization. A waste is no more a useless material but a valuable resource. A hydrometallurgical approach is taken in this invention for the elimination and utilization of the industrial waste sludge based on the consideration of process economics and environmental impact. The process comprises the following operations:

Step 1—Dissolution of waste sludge with sulfuric acid and hydrogen peroxide

The waste sludge as received is first treated with concentrated sulfuric acid and hydrogen peroxide at a sufficient temperature for a sufficient time to solubilize the major portion of iron, manganese, and other base and rare metals such as Sc, rare earths, cobalt, chromium, yttrium, etc., in a small liquid volume which is then separated from the insoluble residue. The dissolution to yield a concentrated metals solution in a small volume offers advantageous processing economics. The residue contains the major portion of tungsten, silicon, and other refractory metals such as tantalum and niobium. The starting waste sludge is composed of fine particles of hydrous metal oxides, mainly iron oxides and manganese oxides. The iron oxides exist probably as magnetite because the sludge is magnetic. X-ray diffraction did not reveal any crystalline phase indicating the amorphous nature of the sludge. The use of hydrogen peroxide is unique in this disclosure by optimally addressing the specific waste sludge characteristics and the overall metal recovery process. Hydrogen peroxide is used both as a reductant and an oxidant. A reductant is needed to reduce the major portion of manganese which exists in its tri- and/or tetra-valent state to the divalent state. The tri- or tetra-manganese is not soluble, while the divalent manganese is very soluble, in water or weakly acidic solution. As an oxidant, hydrogen peroxide oxidizes the divalent iron to its ferric state in acidic solutions. This is essential for the complete recovery of iron to a hydrous solid iron (III) oxide by a selective precipitation process. The reduction of tri- and tetra-valent manganese is necessary in order to bring it completely into solution. The redox reaction between manganese (IV) dioxide and hydrogen peroxide in acidic medium as shown in equation (1) proceeds readily to completion. The manganese (IV) is reduced to its divalent state which has a high solubility in acidic solution. The hydrogen peroxide is decomposed with the evolution of oxygen gas which in turn oxidizes the ferrous iron to ferric state. This redox reaction is shown in equation (2). The ferrous iron can also be oxidized directly by hydrogen peroxide in acidic condition according to the reaction shown in equation (3). Hydrogen peroxide is an inexpensive and clean commodity chemical. Its end products are water and oxygen. The complete oxidation of iron to its trivalent state is essential for its quantitative recovery in the subsequent selective precipitation.

$$MnO_2 + H_2SO_4 + H_2O_2 \rightarrow MnSO_4 + O_2 + 2H_2O \qquad (1)$$

$$4FeSO_4 + O_2 + 2H_2SO_4 \rightarrow 2Fe_2(SO_4)_3 + 2H_2O \qquad (2)$$

$$2FeSO_4 + H_2O_2 + H_2SO_4 \rightarrow Fe_2(SO_4)_3 + 2H_2O \qquad (3)$$

Step 2. The alkali digestion of acid residue to recover and separate tungsten and other metals.

The insoluble residue from the Step 1 acid dissolution contains the major portion of tungsten, silicon, and other refractory metals such as tantalum and niobium. The residue is digested with an alkali such as sodium hydroxide at a sufficient temperature for a sufficient time to solubilize the major portion of tungsten into a liquid concentrate which is separated from the alkali insoluble residue. This liquid concentrate contains two major components: tungsten and silicon, and is a valuable source for tungsten. The digestion of the acid residue with an alkali, for example sodium hydroxide, results in the conversion of tungsten ores to the soluble tungstate of sodium salt. The main chemical reaction involved in alkali digestion of the acid residue represented by a wolframite mineral, is shown in equation (4).

$$(Fe,Mn)WO_4 + 2NaOH \rightarrow (Fe,Mn)(OH)_2 + 2Na^+ + WO_4{}^{2-} \qquad (4)$$

Step 3. The dissolution of the alkali residue with a mineral acid to recover and separate tantalum and niobium The alkali residue from Step 2 contains the major portion of tantalum and niobium. It also contains the hydroxides of Fe, Mn, Ca, and other transition metals. The residue is treated with an acid to bring these metals into solution which is separated from the insoluble residue. The insoluble residue contains the major portion of tantalum and niobium and is a viable resource of these metals. The solution is combined with the acidic solution from Step 1 and is used as a feed solution for the subsequent recovery of all the valuable metals such as Mn, Fe, Sc, rare earths, Cr, etc.

Step 4. The selective recovery of Fe from the concentrated acidic solution.

The combined acidic solution from Steps 1 and 3 is a concentrated solution of transition and rare metals. It contains two major components, Fe and Mn. The typical metal concentrations in the solution are: Fe, 20-60 g/l; Mn, 20-60 g/l; and Sc, 0.06-0.4 g/l. Sc is used here to represent the minor components of the transition and rare metals such as Cr, rare earths, Zn, etc., which are present in much lower concentrations than Fe and Mn. The reason for using scandium as a representative is because it is the most valuable metal contained in the sludge and the major thrust is to recover it quantitatively and cost-effectively. The recovery of scandium is strongly interfered within the presence of enormous amounts of iron which exists mainly in its trivalent state. The iron: scandium ratio in the solution is over 300.

The basic approach to the separation and recovery of these metals is the stepwise neutralization of the acidic solution with a base to three distinct pH ranges with a consequent precipitation of particular metals at each pH range, thereby yielding three solid fractions of metal hydroxide products. The two major components, Fe and Mn are recovered individually as their hydroxide products and all the other minor but more valuable metals as a group of solid hydroxide concentrates. The heart of the neutralization and precipitation (or a selective precipitation system) is the pH control process, which must carefully adjust the pH to the level required to precipitate the optimal quantity of the desired metal(s). The neutralization and precipitation is very attractive, environmentally, economically and technologically. Only a low-priced commodity chemical, a base such as sodium, ammonium, or potassium hydroxide is needed in the whole process. The rationale is to recover iron first simply, by the neutralization of the acidic feed solution with a base to a pH of about 3.5 to form a solid iron hydroxide precipitate. The solid iron product is separated from the solution which is further treated with a base to a pH of about 7.5 to yield the second fraction of a solid precipitate. This solid product contains almost all of the metals, except the two major metals of Fe and Mn, and is in a small volume because all these minor metals are present in low concentrations. This has a natural consequence of upgrading these metals in the precipitate which becomes a viable metals resource. The resulting solution is further adjusted with a base to a pH of about 9.5 to form the third solid fraction, manganese hydroxide. All the metals in the starting solution, especially the heavy metals, are recovered after these three stages of neutralization to the three solid products. The resulting effluent will have very low metal content and can be discharged directly. However, because of its alkaline and water values, the effluent can also be recycled for the neutralization and dilution of the initial acidic feed solution. The effluent recycle is attractive because it reduces both the amounts of fresh water needed in the process and the amount of wastewater to be discharged.

Experimentally, the iron is recovered from the acidic solution by adding a base to adjust the pH of the solution between 3 and 4, preferably 3.5 to yield an iron (III) hydroxide precipitate. The pH control is very essential because it determines the recovery yield and contamination of iron product. At lower pH the recovery yield is low and at higher pH the contamination (or coprecipitation) of other metals is more significant. A pH of 3.5 is the best compromise.

In industry chemical precipitation using hydroxide, carbonate, sulfide, etc., is by far the most widely used process to recover and/or remove metals from solution. The most commonly used precipitation technique is hydroxide treatment due to its relative simplicity, low cost of precipitant and ease of automatic pH control. Employing hydroxide precipitation at elevated pH provides conditions where the metal hydroxides have very low solubilities and precipitate out upon settling, typically over time periods of 2 to 4 hours. When two or more metals are in the same stream, the optimum pH for precipitation may be different for each metal. This is the basis of separation in this disclosure. The question is whether it is possible and practical to precipitate one or more of the metals at one pH and separate other metals in the remaining solution at another pH. It must also be determined if one pH condition could be found to provide satisfactory removal of each of the metal ions present in the solution. The presence of complexing agents has to be taken into consideration because it has an effect on the recovery of heavy metals. Complexation often increases the solubility of a metal precipitate. J.G. Dean, F. F. Bosqui, and K. H. Lanoutte, Environ. Sci. Tech. 6(6), 518-522 (1972) pointed out the benefits of recirculating a portion of the precipitated particles to provide seeds for the newly formed precipitates to agglomerate.

The basic principle of the metals separation by the neutralization and precipitation process is the difference in solubility products among various metal hydroxides. Solubility products for a number of metal hydroxides have been published in the literature. However, in practice, because of precipitate aging, incomplete solid separation, or coprecipitation/adsorption effects in the solution, solubility products can only provide a rough indicator of the metal residual concentrations that can be expected in the solution. Most metals form a series of complexes with hydroxide and other anions, so that the theoretical solubility limit becomes a complex function of pH. Theoretical solubility values may not be achieved in practice due to such factors as solution composition, temperature variations and non-equilibrium phenomena such as the phase transformation from a kinetically favored amorphous precipitate to the more thermodynamically favored crystalline precipitate. Although precipitation kinetics could be controlling the treatment rate, the particle size controls the apparent removal effectiveness. The efficient solid-liquid separation is an important issue in the precipitation process. There are limitations associated with the hydroxide precipitation processes. Metal hydroxide precipitates tend to resolubilize if the solution pH changes. The metal hydroxide precipitates are often consisting of colloidal and amorphous particles resulting in a voluminous product which is generally difficult to dewater. The solubility products of some metal hydroxides that are likely to be present in typical waste materials are shown in Table 2.

TABLE 2

Solubility products of metal hydroxides*

| Metal hydroxide | Solubility product | pH at which precipitation occurs with a metal concentration of 0.1M | pH at which precipitation occurs with a metal concentration of 0.0001M |
| --- | --- | --- | --- |
| $Fe(OH)_3$ | $4.0 \times 10^{-38}$ | 1.9 | 2.9 |
| $Fe(OH)_2$ | $8.0 \times 10^{-16}$ | 7.0 | 6.5 |
| $Mn(OH)_2$ | $1.9 \times 10^{-13}$ | 8.1 | 9.6 |
| $Al(OH)_3$ | $1.3 \times 10^{-33}$ | 3.4 | 4.4 |
| $Ce(OH)_3$ | $1.6 \times 10^{-20}$ | 7.7 | 8.7 |
| $Ce(OH)_4$ | $2.0 \times 10^{-48}$ | 2.3 | 3.1 |
| $Cr(OH)_3$ | $6.3 \times 10^{-31}$ | 4.3 | 5.3 |
| $Bi(OH)_3$ | $4.0 \times 10^{-31}$ | 4.2 | 5.2 |
| $Co(OH)_2$ | $1.6 \times 10^{-15}$ | 7.1 | 8.6 |
| $Ni(OH)_2$ | $2.0 \times 10^{-15}$ | 7.2 | 8.7 |
| $Pb(OH)_2$ | $1.2 \times 10^{-15}$ | 7.0 | 8.5 |
| $Cu(OH)_3$ | $2.2 \times 10^{-20}$ | 4.7 | 6.2 |
| $La(OH)_3$ | $2.0 \times 10^{-19}$ | 8.1 | 9.1 |
| $Sc(OH)_3$ | $8.0 \times 10^{-31}$ | 4.3 | 5.3 |
| $Eu(OH)_3$ | $8.9 \times 10^{-24}$ | 6.6 | 7.6 |
| $Gd(OH)_3$ | $1.8 \times 10^{-23}$ | 6.8 | 7.8 |
| $Nd(OH)_3$ | $3.2 \times 10^{-22}$ | 7.2 | 8.2 |
| $Th(OH)_4$ | $4.0 \times 10^{-45}$ | 3.2 | 3.9 |
| $Y(OH)_3$ | $8.0 \times 10^{-23}$ | 7.0 | 8.0 |
| $Zn(OH)_2$ | $1.2 \times 10^{-17}$ | 6.0 | 7.5 |

*These data were taken from John A. Dean (Ed). Lange's Handbook of Chemistry, 12th Edition, McGraw-Hill Book Company, 1979, pp. 5-7.

Step 5—The selective recovery of metals from Fe-depleted solution

The Fe-depleted solution having a pH of about 3.5 contains one major component of manganese and other metals in a much smaller concentration. The recovery of these metals, except manganese, is achieved by adjusting the pH of the solution with a base to a value between 7 to 8, preferably 7.5 to yield a solid metal hydroxide precipitate which is separated from the solution. The selection of an optimal pH is essential in achieving good recovery yield with little manganese contamination.

Step 6—The recovery of manganese from the solution by an oxidative precipitation process.

After the recovery of iron and other metals, the solution having a pH of about 7.5 contains essentially only the manganese values. The manganese is typically recovered by an oxidative precipitation process at a pH between 8 to 10 to yield a solid product of hydrous manganese (III) oxide. The manganese recovery is quantitative, resulting in an effluent which contains virtually no heavy metals and can be discharged directly. The manganese product is a viable source for the production of metallurgical manganese metal or other manganese compounds. The manganese recovery is typically done by adding a base to the solution under an oxidative environment to a pH between 8 to 10, preferably 9.5, to result in a solid manganese hydroxide precipitate. The oxidative environment can be maintained by bubbling air or oxygen through the solution or by adding an oxidant such as hydrogen peroxide to the solution. The oxidative environment is to oxidize divalent manganese in an alkaline medium to its trivalent state which has a lower solubility product. The solid-liquid separation is easy and can be done by any standard separation technique. Filtration under vacuum was often used in this study. The final effluent has a pH of less than 10 and can be discharged directly into a wastewater stream without further treatment. Because of its alkaline values, it can also be recycled to dilute the concentrated acidic solution of Step 4. This recycling achieves two purposes. One is to fully use the alkaline values and the other is to save the amount of fresh water needed. In practice, diluting the concentrated acidic solution is required to facilitate the neutralization and precipitation operation. Furthermore, diluting with the effluent has an additional advantage of increasing the ionic strength of the resulting solution which in general makes the filtration easier due to the formation of better particle morphology.

The implementation of this disclosure is further demonstrated by examples below. These examples are not to be viewed as limiting the scope of the disclosure but are merely illustrative of its features. All parts, percentages and proportions are by weight unless otherwise indicated.

EXAMPLE I

About 10 grams of tungsten ore sludge are treated with about 50 ml of concentrated sulfuric acid and about 10 ml of 30% hydrogen peroxide to yield a thick black slurry. There is substantial foaming due to the evolution of oxygen gas. After the reaction subsides, the slurry is heated and maintained at the temperature near the boiling point for about two hours. Water is occasionally added to facilitate the stirring. The slurry is filtered and washed to yield a digestion solution of about 100 ml and a wet residue. The wet residue is dried at about 105° C. to yield about 2.75 grams of a gray powder. The digestion solution contains a concentration of about 23 g/l of Fe, about 21g/l of Mn and about 0.05 g/l of Sc. The residue is further treated with about 25 ml of 6N HCl at a temperature around 75° C. for about two hours to form a digestion solution which is separated from the insoluble solid which is dried at 105° C. to yield about 2 grams of a light gray powder. The digestion solution from the hydrochoric acid treatment, about 100 ml contains concentrations of about 0.2 g/l of Fe, about 0.1 g/l of Mn and about 0.0001 g/l of Sc. This is less than 1% of the concentrations in the sulfuric acid-hydrogen peroxide digestion solution. Hydrochloric acid brings all the transition and rare metals such as iron, manganese, rare earths, scandium, etc., into solution. This indicates the effectiveness of the sludge dissolution with a mixture of sulfuric acid and hydrogen peroxide to yield a concentrated acidic solution which contains almost all the acid leachable metals. It also eliminates about 80% of the mass of the waste sludge. This is attractive both in the waste disposal and metal recovery because only one simple dissolution operation is needed.

EXAMPLE 2

An acidic solution containing a concentration of about 8 ppm of Sc, 6300 ppm of Mn and 2400 ppm of Fe, is treated with ammonium hydroxide as a base to recover its metal values into three fractions. Ammonium hydroxide is used to avoid possible contamination of the scandium with other metals. Sodium hydroxide is equally effective and less expensive and can be used if sodium contamination of the scandium is permissible. The neutralization and precipitation is done by adding about 30 ml of concentrated ammonium hydroxide to about 200 ml of the acidic solution to raise the pH to about 2.8. The pH of the solution is then increased to a value of about 3.8 by adding sufficient ammonium hydroxide solution having a normality of about 1. A brown slurry is formed. About 37 ml of the 1 N ammonium hydroxide solution is used. The slurry is heated to about 95° C. and then is maintained at about 70° C. for about one hour. The slurry is filtered to separate the brown precipitate from the filtrate. Upon drying of the wet precipitate at about 105° C., about 1.15 grams of a brown solid are obtained. The solid is dissolved in about 100 ml of dilute HCl and the solution analyzed. This solution contains a concentration of about 1.05 ppm of Sc, about 97 ppm of Mn and about 4400 ppm of Fe. Thus, about 98% of the iron is recovered in the solid and the contamination from Sc and Mn is minimal.

The filtrate has a volume of about 200 ml at a pH of about 3.3. About 4.2 ml of 1 N NH$_4$OH is added to give a pH of about 7.0 to yield a cloudy solution. The filtration yields a clear pinkish filtrate and a very small amount of a brown precipitate. The filtrate, about 275 ml, at a pH of 7, contains a concentration of about 0.07 ppm of Sc, 2.4 ppm of Fe and 4500 ppm of Mn. About 99% of the Mn values still remains in this solution. The precipitate is dissolved in about 100 ml of dilute HCl and contains a concentration of about 21.8 ppm of Sc, about 17.4 ppm of Mn and about 270 ppm of Fe. The retention of Sc in the precipitate is about 90% of the original value. The scandium concentration is greatly upgraded in a very small volume of a solid concentrate which is a viable source for the preparation of high purity scandium products. The coprecipitation of Mn is negligible. The results also show that the residual iron from the first selective precipitation is precipitated. This has an advantage of making the manganese product free of the iron contamination. The resulting filtrate is further treated with an ammonium hydroxide solution to a pH of about 9.5 under air bubbling to precipitate manganese as a black manganese hydroxide.

The recovery of manganese from the solution is done by an oxidative precipitation process at a pH between about 8 and about 10. About 10,300 ml of a combined filtrate which has a pH of about 7 and contains a concentration of about 68 ppm of Fe and about 8000 ppm of Mn is titrated with about 3,800 ml of 1 N NaOH to a pH of about 9.5 at room temperature. A creamy light brown slurry is obtained. After bubbling air through the slurry overnight, a black slurry is obtained. The air bubbling is done to insure the complete precipitation of manganese hydroxide by the conversion of divalent manganese to the trivalent state. The trivalent manganese has a much lower solubility product in alkaline medium than the divalent manganese. The slurry is filtered to yield a black precipitate. Upon drying the wet precipitate, about 118 grams of a black powder is obtained. The impurity content of this manganese product is shown in Table 3. The recovery of manganese is quantitative, because the clear and colorless filtrate contains essentially no iron or manganese. A 500 ml volume of the filtrate is evaporated to dryness and about 17 grams of white solid sodium sulfate is obtained. The impurities present in the white solid sodium sulfate are shown in Table 4. It clearly indicates the effective recovery of manganese and other heavy metals. The liquid waste is compatible with the environmental discharge rules. However, the filtrate effluent has an alkaline value and can be used in dilution and neutralization of the concentrated acidic solution from Step 4. This is attractive from the point of view of both water conservation and environmental protection.

TABLE 3

Impurities present in manganese (III) oxide product as determined by a spark source mass spectrometric method

| Element | ppm wt |
|---|---|
| Na | 2600 |
| Mg | 300 |
| Al | 14 |
| Si | 940 |
| S | 2400 |
| K | 3.1 |
| Ca | 3600 |
| Cr | 7.2 |
| Fe | 2600 |
| Ni | 340 |
| Co | 3600 |
| Zn | 300 |
| Y | 12 |
| La | 89 |
| Ce | 170 |
| Pr | 9.4 |
| Nd | 18 |

TABLE 4

Impurities present in the dried solid obtained from evaporation of the liquid waste as determined by a spark source mass spectrometric method

| Element | Solid. ppm |
|---|---|
| Li | 1.2 |
| Mg | 580 |
| Al | 11 |
| Si | 350 |
| P | 16 |
| Cl | 49 |
| Ca | 1700 |
| K | 250 |
| Cr | 1.2 |
| Mn | 98 |
| Fe | 44 |
| Br | 35 |

EXAMPLE 3

About 100 grams of tungsten ore waste sludge are diluted with about 250 ml of water to form a stirrable paste and then about 80 ml of concentrated sulfuric acid (36 N) are added. The temperature is raised to about 65° C. About 35 ml of 30% by volume hydrogen peroxide is then added in 5 increments in about 15 minutes. Adding hydrogen peroxide caused some foaming but it is easily managed by proper addition. A black slurry is formed and is then heated and kept at about 110° C. for about three hours. Filtration yields a dark brown filtrate and a residue. The filtrate is about 250 ml and contains a concentration about 0.4 g/l of Sc, about 52 g/l of Fe, and about 66 g/l of Mn. The residue is washed with about 0.2 N sulfuric acid to yield about 420 ml of a wash solution that contains a concentration of about 0.09 g/l of Sc, about 12 g/l of Fe and about 13 g/l of Mn. The dissolution and washing brings about 98.5% of Sc, 97% of Fe, and 99.1% of Mn from the initial waste sludge into solution. The residue is dried at about 105° C. and about 24.8 grams are obtained. It is than digested with about 25 ml of concentrated HCl at 90° C. for about an hour to form a digestion solution and about 22 grams of an acidic residue. The digestion solution of about 200 ml contains a concentration of about 0.001 g/l of Sc, 2.7 g/l of Fe and 1.0 g/l of Mn. The insoluble residue is treated with about 100 ml of 1 N NaOH at about 95° C. for two hours to form an alkaline digestion solution which is separated from the alkali residue. This alkali digestion solution of about 100 ml contains a concentration of about 0.8 ppm of Sc, 54 ppm of Fe, 8 ppm of Mn and 20800 ppm of W. Thus, more than 90% of the tungsten values from the initial waste sludge is recovered in this liquid concentrate.

Upon drying the wet insoluble residue, about 13.4 grams of a gray solid powder is obtained. The residue contains the major portion of tantalum and niobium. A typical composition of the alkali residue as determined by a spark source mass spectrometric method is shown in Table 5. The elemental composition of an acidic residue is also shown in the second column of Table 5.

TABLE 5

Elemental composition of the acid and alkali residues (by spark source mass spectrometric analysis)

| Element | Acid residue, % | Alkali residue, % |
| --- | --- | --- |
| W | 26.6 | 0.5 |
| Si | 23.4 | 21.6 |
| Ti | 4.5 | 7.7 |
| Fe | 3.88 | 6.2 |
| Sn | 3.84 | 2.7 |
| Nb | 1.51 | 1.3 |
| Ta | 0.99 | 2.4 |
| Mn | 0.95 | 1.1 |
| Al | 0.93 | 1.5 |
| B | 0.92 | |
| Cl | 0.45 | |
| K | 0.39 | |
| Ca | 0.29 | 0.2 |
| As | 0.27 | |
| P | 0.16 | |
| Zr | 0.12 | 0.2 |
| Cr | 0.07 | |
| Mg | | 0.5 |
| Zn | | 0.3 |
| Y | | 0.2 |
| Th | | 0.2 |
| Nd | | 0.1 |

While there has been shown and described what are at present considered the preferred embodiments of the invention, it will be obvious to those skilled in the art that various changes and modifications may be made therein without departing from the scope of the invention as defined by the appended claims.

What is claimed is:

1. A process comprising:
a) contacting a solid waste material containing metal values that comprise at least tungsten, iron, scandium and manganese and optionally, at least one other metal value which metal is selected from the group consisting of Group III metals, cobalt, nickel and rare earth metals and, other refractory metals selected from the group consisting of tantalum, niobium and mixtures thereof and silicon with a sulfuric acid solution containing a concentration of hydrogen peroxide of at least about 3% by volume for a sufficient time at a sufficient temperature to form a first aqueous acidic leachate containing the major portion of said scandium, manganese, iron and, if present, said other metal values and a first solid residue containing said tungsten, and, if present, said other refractory metals,
b) separating said first aqueous leachate and said first solid residue,
c) digesting said first solid residue with sufficient alkali metal base for a sufficient time to form a first digested solution containing a major portion of said tungsten and a second solid residue containing, if present, said other refractory metals,
d) separating said second solid residue and said first digested solution,
e) leaching said second solid residue with sufficient hydrochloric acid for a sufficient time to form a second acidic leachate and a third solid residue containing the major portion of said other refractory metals, if present,
f) recovering a solid iron containing product and an aqueous solution consisting said manganese, scandium and, if present, said other metal value by a step consisting essentially of adjusting the pH of said first aqueous acid leachate with base to achieve a pH of from about 3 to about 4,
g) separating said solid iron containing product and said aqueous solution containing said manganese, scandium and, if present, said other metal value,
h) adjusting the pH of said aqueous solution containing said manganese, scandium and, if present, said other metal value, with base to achieve a pH of from about 7 to about 8 to yield a solid product containing scandium and, if present, said other metal value, and an aqueous solution containing said manganese,
i) separating said solid product and said aqueous solution containing said manganese,
j) quantitatively recovering a solid manganese continuing product and an aqueous solution essentially depleted of all metal values by oxidizing said aqueous solution containing said manganese at a pH from about 8 to 10 in the presence of a base, and
k) separating said manganese containing product and said aqueous solution essentially depleted of metal values.

2. A process according to claim 1 wherein said sulfuric acid solution has a normality of greater than about 1.

3. A process according to claim 1 wherein iron is recovered as iron oxide.

4. A process according to claim 1 wherein manganese is recovered as manganese oxide.

5. A process according to claim 1 wherein tungsten is recovered as an aqueous solution of sodium tungstate.

6. A process according to claim 1 wherein said scandium containing product is dissolved in an aqueous solution of hydrochloric acid at a pH of from about 1.9 to about 2.1 and is thereafter removed from the resulting solution by contacting the resulting solution with an iminodiacetic acid cation exchange resin.

7. A process according to claim 6 wherein said scandium is eluted from said cation exchange resin by a chelating agent selected from the group consisting of diglycolic acid, carboxylic acids, ethlenediaminetetraacetic acid and mixtures thereof.

8. A process according to claim 7 wherein said chelating agent is diglycolic acid.

9. The process according to claim 1 further comprising separating said second acidic leachate from said third solid residue and combining said second acidic leachate with said first acidic leachate prior to step (f).

* * * * *